(12) United States Patent
Quinn et al.

(10) Patent No.: US 7,107,275 B2
(45) Date of Patent: *Sep. 12, 2006

(54) EDIT COMMAND DELEGATION PROGRAM FOR EDITING ELECTRONIC FILES

(75) Inventors: Andrew K. Quinn, Seattle, WA (US); Mandira Virmani, Redmond, WA (US); William Kennedy, Issaquah, WA (US); Marc A. Olson, Seattle, WA (US); Sean E. McAteer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/225,573

(22) Filed: Aug. 21, 2002

(65) Prior Publication Data

US 2003/0028850 A1 Feb. 6, 2003

Related U.S. Application Data

(63) Continuation of application No. 09/333,592, filed on Jun. 15, 1999, now Pat. No. 6,449,617.

(51) Int. Cl.
*G06F 7/00* (2006.01)
*G06F 5/00* (2006.01)

(52) U.S. Cl. ............................. 707/100; 719/328
(58) Field of Classification Search ................ 707/1–2, 707/100–104, 8; 709/328–329; 719/328–329
See application file for complete search history.

(56) References Cited

U.S. PATENT DOCUMENTS 5,008,853 A * 4/1991 Bly et al. .................. 364/900
5,634,064 A * 5/1997 Warnock et al. ............ 395/774
5,640,566 A * 6/1997 Victor et al. ................ 395/701
6,240,414 B1 * 5/2001 Beizer et al. .................. 707/8
6,449,617 B1 * 9/2002 Quinn et al. ................ 707/100

FOREIGN PATENT DOCUMENTS

EP 939405 A2 * 9/1999

OTHER PUBLICATIONS

Kiely, Don, "Secure NT Apps—Microsoft Delivers Flexibility in Authentication and Access Control", InformationWeek, p. 1, Feb. 2, 1998, ISSN: 8750-6874.*

* cited by examiner

*Primary Examiner*—Mary D. Cheung
(74) *Attorney, Agent, or Firm*—Merchant & Gould P.C.

(57) ABSTRACT

An edit command delegation (ECD) utility that provides a user with the ability to edit an electronic file in a creator application program while the electronic file is open in a separate viewing application program operable only for viewing the electronic file. In response to a user input to edit the electronic file, the ECD utility opens the electronic file and reads an application identification tag contained within the content of the electronic file. The application identification tag identifies a creator application program, which was used to create the electronic file and is operable for editing the content data of the electronic file. Once the ECD utility reads the application identification tag, the ECD launches the creator application program. The ECD utility then causes the creator application program to open the electronic file. Once the electronic file is open, the content data is displayed in a window controlled by the creator application program to allow the user to edit the content data.

4 Claims, 7 Drawing Sheets

EDIT COMMAND DELEGATION PROGRAM FOR EDITING ELECTRONIC FILES

"This application is a continuation of application Ser. No. 09/333,592, filed Jun. 15, 1999 now U.S. Pat. No. 6,449,617, which application(s) are incorporated herein by reference."

TECHNICAL FIELD

This invention relates generally to software browsers and editors and, more particularly, relates to opening a hypertext markup language (HTML) file in an application program used to create the HTML file while viewing the HTML file in a browser program.

BACKGROUND OF THE INVENTION

Most electronic files created by an application program have an external identifier tag assigned by the particular application program that was used to create the electronic file. The external identifier tag, which identifies the format in which the electronic file is stored, is a separate indicator that is attached to the electronic file. Generally, there are numerous specific file formats, such as word processing, database, spreadsheet, and graphics files. These specific file formats contain specialized information that only the application, which was used to create the electronic files, can fully interpret. Therefore, it is important that the application program used to create the electronic file is able to recognize and open the electronic file.

One way to associate the electronic files with the application program that created them is to use extensions. Extensions are a set of predefined characters added to the file name by the application program. This method of associating an electronic file with an application program is used by many computer operating systems, such as the "WINDOWS 98" operating system manufactured by the Microsoft Corporation of Redmond, Wash. For example, if a spreadsheet program such as Microsoft Corporation's "EXCEL" program, is used to create an electronic spreadsheet file, the spreadsheet program appends the extension ".XLS" at the end of the filename each time the electronic file is saved to a disk. The XLS extension indicates that the "EXCEL" program was used to create the electronic spreadsheet file, and that the file is saved in an "EXCEL" specific format. In this manner, the file is associated with the corresponding electronic spreadsheet program.

The use of file extensions has several benefits. First, the file extension allows the user to quickly identify the electronic files that are associated with a particular application when the user views a list of files contained within a directory or a folder. Second, and more importantly, the extension associates the electronic file with the particular application program which was used to create the file. The logical association, which is typically stored in a look-up table within the computer system or disk, allows simple, easy file management by the user.

For example, the user can open an electronic file by selecting the electronic file with a pointing device, such as a mouse. The computer operating system retrieves the extension, locates the extension in the look-up table stored in the computer system or disk, and retrieves and launches the associated application program using the electronic file as input.

Another method of associating an electronic file with an application program is to write an identifier tag within the electronic file to indicate which application program is associated with the electronic file. The identifier tag associates the format of the electronic file with a particular application and is stored within the electronic file itself. The logical association of the external identifier tag to the particular application is stored in a look-up table in the computer system or hard disk drive.

However, each prior method of file identification has the drawback that only one application program can be associated with an electronic file. Usually, this does not pose a problem to users because most electronic file operations can be performed by one application program. However, there are instances when an electronic file needs to be associated with two or more different application programs.

For example, if an electronic file is created using the "EXCEL" spreadsheet program and is saved in a Hypertext Markup Language (HTML) format, the electronic file needs to be associated with two application programs. First, the electronic file needs to be associated with a browser application program, such as Microsoft's Internet Explorer, so that the user can view the content of the HTML-formatted file. Second, the file needs to be associated with the "EXCEL" program to allow the user to edit the content of the electronic file. Typically, the electronic file is associated with the application program capable of viewing the file format. In the example above, the application associated with the HTML file would be the browser application. This single association restriction can be frustrating and lead to problems for the user. If the user wishes to edit the file, the user must know which application program was used to create the electronic file. However, if the user forgets which application program was used to create the electronic file, or if the user is not the same person who created the electronic file, there may be no easy way to determine which application is associated with the electronic file. If the user wants to edit an electronic file but does not know which application program was used to create it, the user usually must attempt to open the electronic file in each computer application program on the computer operating system until the appropriate application program is found. This process can be time-consuming, inefficient, and frustrating. Thus, there is a need for an improved method to identify, open and edit an electronic file in an application program, which was used to create the file.

Prior attempts to solve this problem include designating a separate program as a default editor to edit the electronic file. That is, each time an edit command is executed by the user in regard to an electronic file, the electronic file is opened in the designated default editor. For example, a text editor may be designated as the default editor for HTML-formatted files. Therefore, when a user selects an HTML-formatted file to edit, the HTML-formatted file is opened in the text editor program, regardless of whether the file was created in a spreadsheet program or a word processing program. As a result, the user may not be able to edit files as they wish, if at all. Specifically, the user may not be able to edit an HTML-formatted file created using "EXCEL" if the default editor is a text-editing program. This inability to edit the HTML file is a frustrating process that can lead to numerous errors.

Thus, there is a need in the art for a method of associating an electronic file with both the program used to view the file and with the program used to create the electronic file, so that a user can easily and quickly edit the electronic file.

SUMMARY OF THE INVENTION

The present invention meets the above-described needs in a software utility by allowing a user to edit an electronic file, having an application identification tag and content data, in a first application program while viewing the content data of the electronic file in a second application program that is capable of only viewing the content data of the electronic file.

Generally described, an edit command delegation (ECD) utility provides a user with the ability to edit an electronic file in a creator application program while the electronic file is open in a separate viewing application program operable only for viewing the electronic file. In response to a user input to edit the electronic file, the ECD utility opens the electronic file and reads an application identification tag contained within the content of the electronic file. The application identification tag identifies a creator application program, which was used to create the electronic file and is operable for editing the content data of the electronic file. Once the ECD utility reads the application identification tag, the ECD launches the creator application program. The ECD utility then causes the creator application program to open the electronic file. Once the electronic file is open, the content data is displayed in a window controlled by the creator application program to allow the user to edit the content data.

More specifically, in response to a user command to edit the content data of the electronic file, the ECD utility determines whether the electronic file contains a first application identification tag. The first application identification tag contains the identification of the creator application program stored in an existing standard format. Using a standard format for the storing the first application identification tag allows for the ECD utility to efficiently identify and retrieve the first application identification tag from the electronic file. If the ECD utility determines that the electronic file contains a first application identification tag, the ECD utility then determines whether the creator application is located on the computer system. Once the ECD utility determines that the creator application is located on the computer system, the ECD utility causes the electronic file to be opened in the creator application program and the content data displayed in a window controlled by the creator application program.

However, if the electronic file does not contain the first application identification tag, the ECD utility searches the electronic file for a second application identification that may identify the creator application. Normally, the second application tag is stored in a non-standard format, such as a text string which is difficult and time consuming to use to identify the creator application program. Therefore, if the ECD utility determines that the electronic file contains the second application identification tag, the ECD utility maps the non-standard formatted second application identification tag to the standard format, which the ECD utility can use to efficiently determine and locate the creator application program.

Once the ECD utility maps the second application identification tag to the creator application program, the ECD utility determines whether the creator application program is present on the computer system. If the creator application program is on the computer system, the electronic file in opened in the creator application program and the content data is displayed in the window. However, if the electronic file does not contain either of the two application identification tags or the creator application program is not located on the computer system, the ECD utility determines whether a default application program is registered to edit the content data of the electronic file. If the determination is made that a default application program is registered to edit the content data, the ECD utility launches the default application program. The default application program then displays the content data in a window controlled by the default application program.

However, if the determination is made that a default application program is not associated with the electronic file, the ECD utility launches an alternative default application program that is operable for editing the content data. The ECD then causes the alternative application program to open the electronic file and display the content data within a computer window controlled by the alternative application program.

The ECD utility may also install itself into a computer system. The ECD utility copies itself onto a hard drive within the computer system. The ECD utility then determines whether an entry associated with a default application program is stored in a first location in a computer system. If the entry exists in the first location, the ECD utility copies the entry to a second location in the computer system. Once the ECD utility has finished copying the entry to the second location, the ECD deletes the entry associated with the default application program from the first location in the computer system and places an entry associated with the ECD utility into the first location in the computer system.

The ECD utility may also open the electronic file using a uniform resource locator (URL) associated with the electronic file. The ECD first determines if a directory path tag is set in the file, which specifies the directory path to the original location of the electronic file. If the directory path tag is present, the ECD utility determines if the original file is currently open in the creator application program. If the electronic file is open in the creator application program, the ECD utility switches to the open file in the creator application program. If the electronic file is not open in the creator application program, the ECD utility passes the directory path to the creator application program to open the file. If the directory path is not set in the file, and the path of the file is not a URL, the ECD utility determines whether the creator application program is capable of opening a URL site. The ECD utility checks a Boolean value in a URL locator entry associated with the creator application program. If a URL locator entry contains the Boolean value "TRUE" (typically denoted as a "1" or a "YES" text string), the ECD utility passes the URL associated with the electronic file to the creator application program to open the file. Otherwise, the ECD utility passes the directory path associated with the electronic file to the creator application program.

That the invention improves over the drawbacks of prior systems and accomplishes the advantages described above will become apparent from the following detailed description of the exemplary embodiments and the appended drawings and claims.

utility for launching a default application program useful for editing an electronic file specified by an application identification tag contained within the electronic file.

Figure 4:
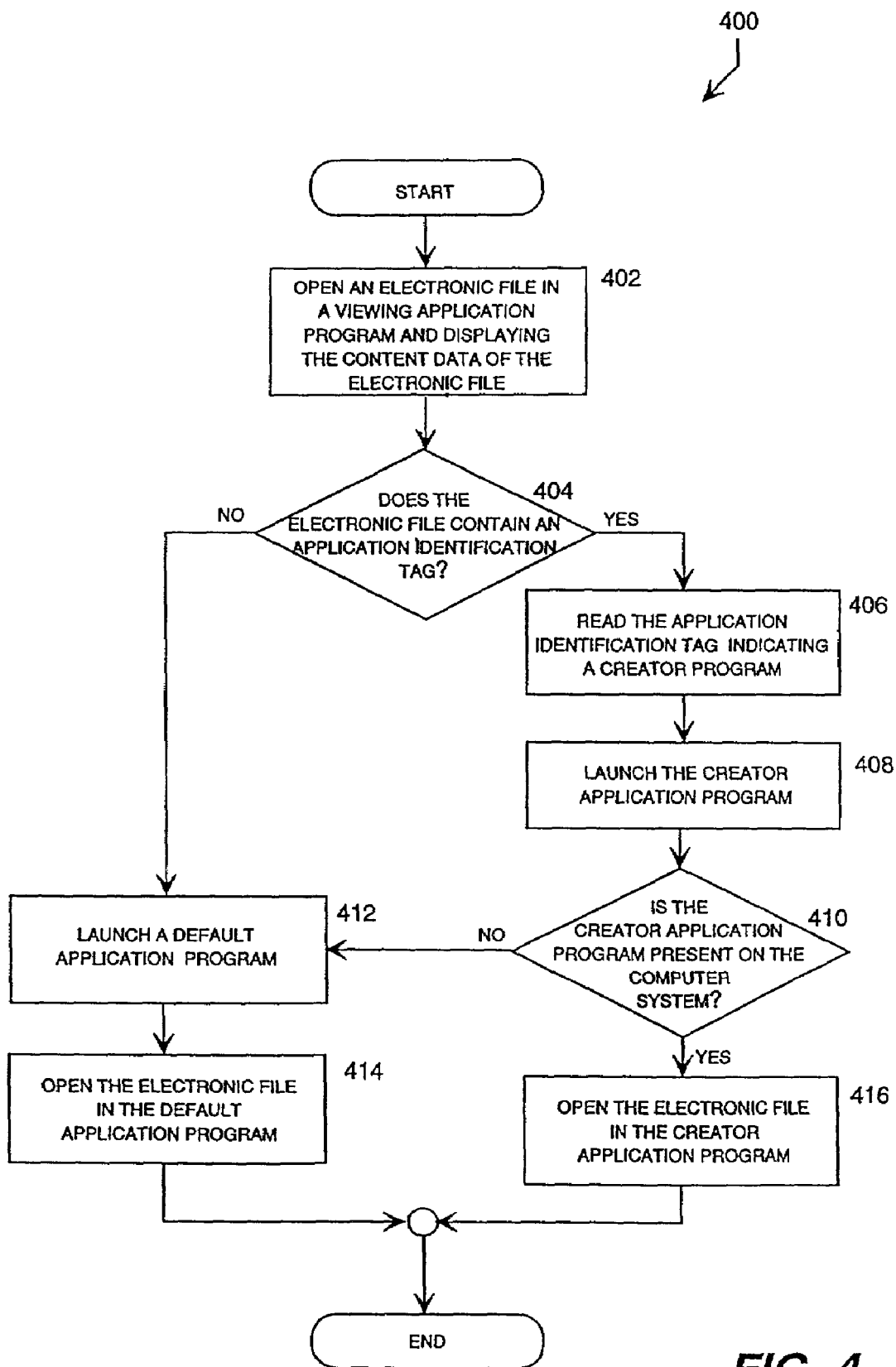

FIG. 4 is a logic flow diagram illustrating an alternative process for applying an edit command delegation (ECD) utility for launching a default application program useful for editing an electronic file specified by an application identification tag contained within the electronic file.

Figure 5:
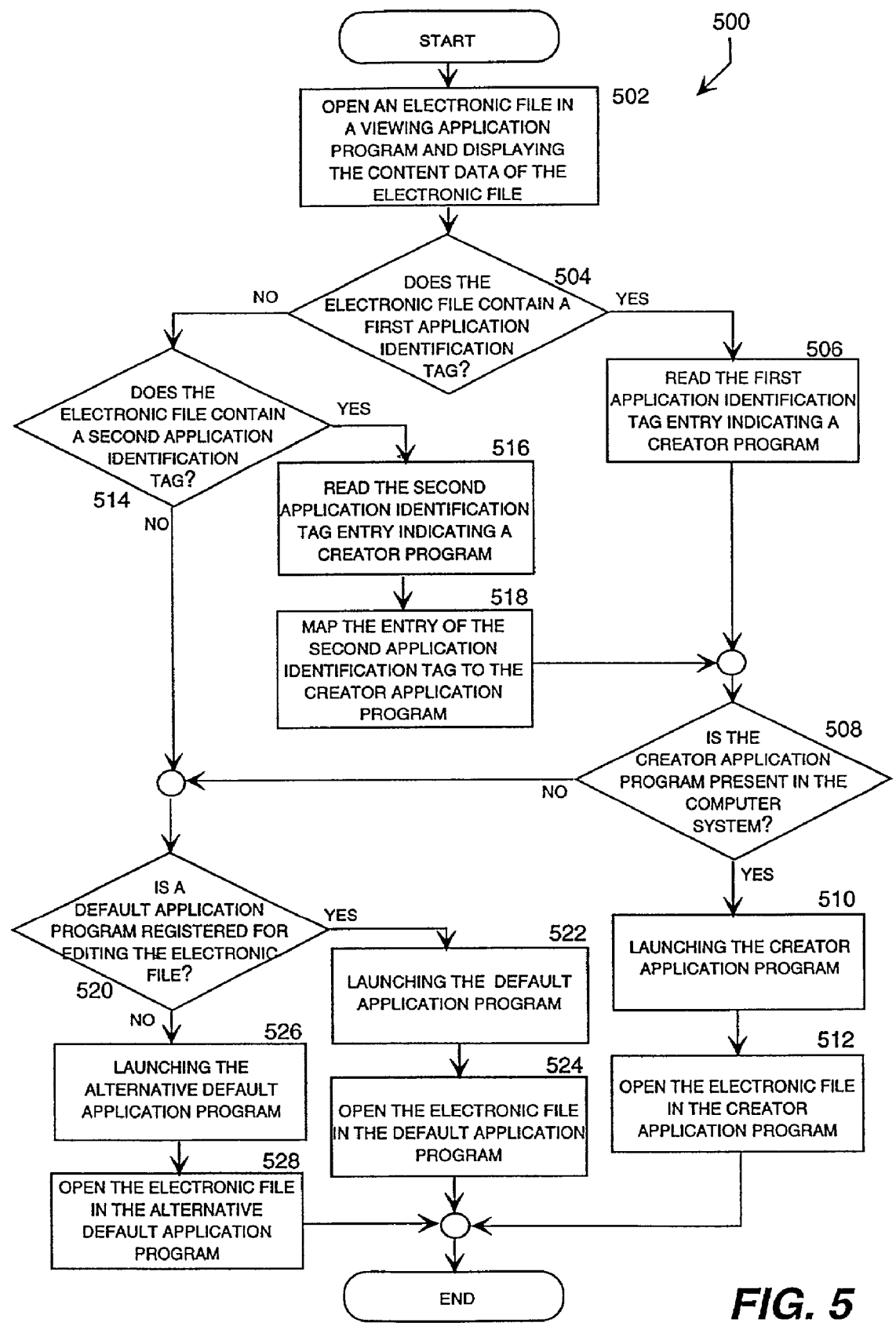

FIG. 5 is a logic flow diagram illustrating another alternative process for applying an edit command delegation (ECD) utility for launching a default application program useful for editing an electronic file specified by an application identification tag contained within the electronic file.

Figure 6:
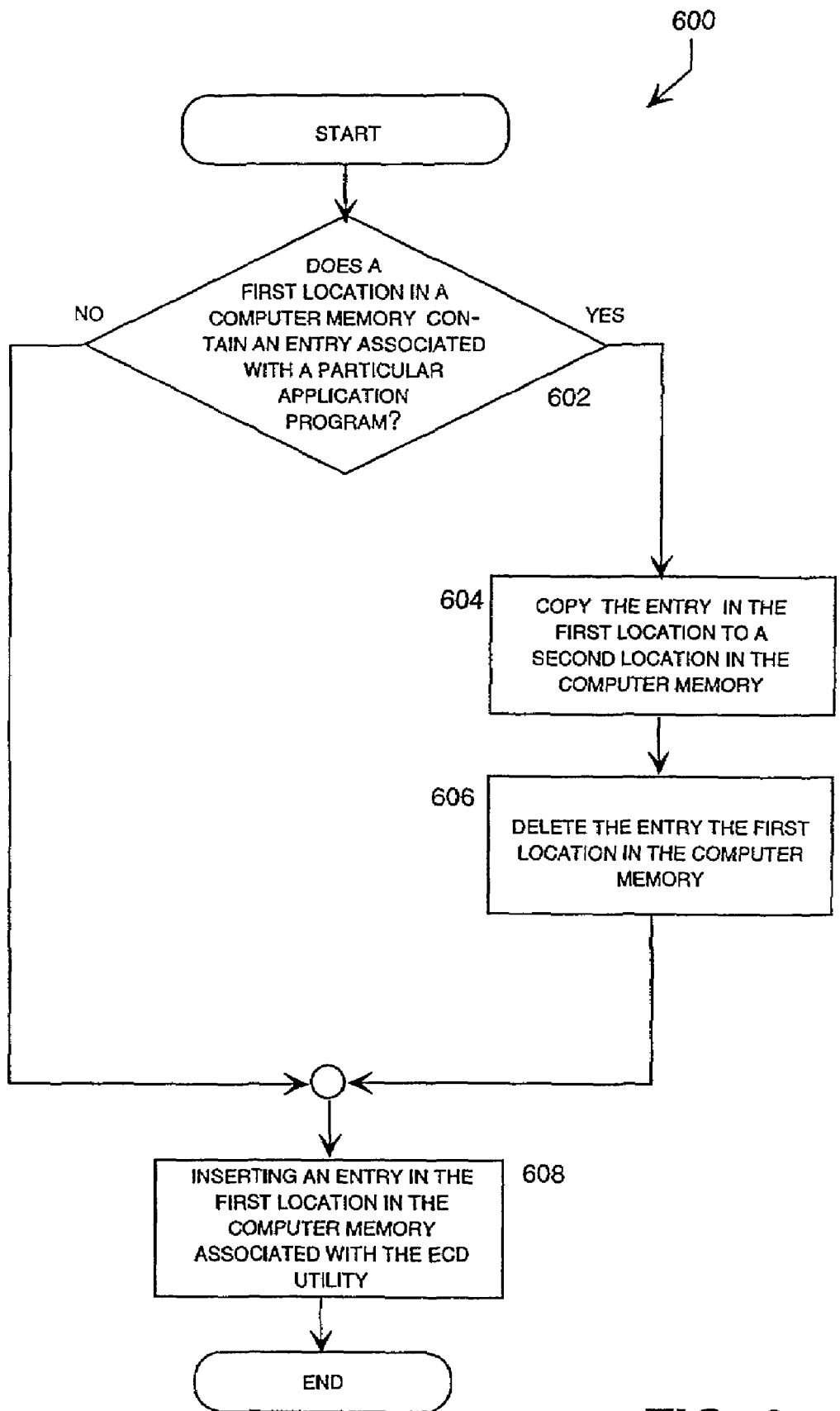

FIG. 6 is a logic flow diagram illustrating an exemplary process for automatically installing an ECD utility onto a computer system.

Figure 7:
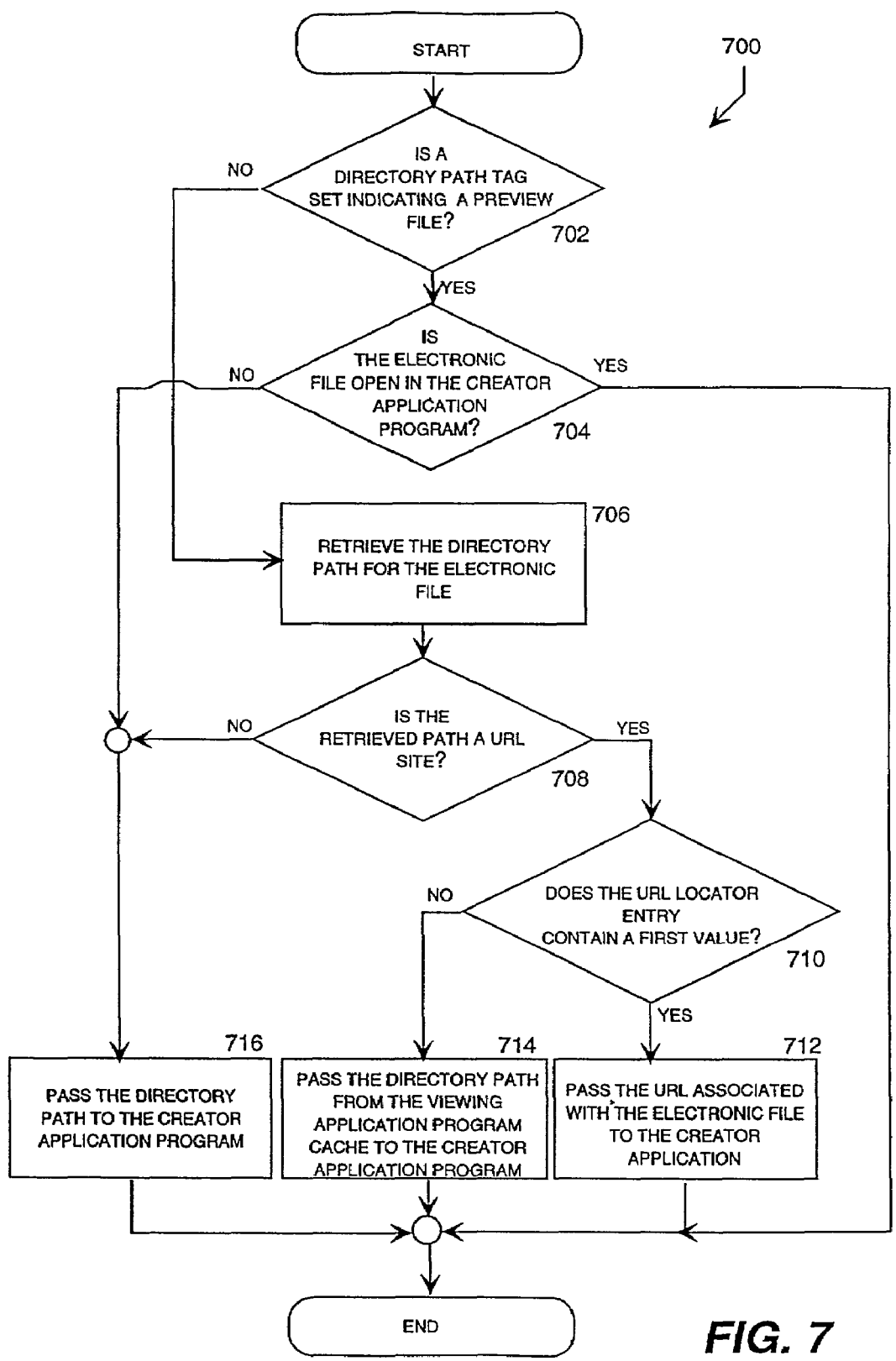

FIG. 7 is a logic flow diagram illustrating an exemplary process for opening an electronic file using the ECD utility.

DETAILED DESCRIPTION OF THE EMBODIMENTS

The present invention may be embodied in a software utility, which is referred to as the "Edit Command Delegation" (ECD) utility. In one embodiment, this utility is incorporated into a component manager application program, such as the "OFFICE 2000" program, marketed by Microsoft Corporation of Redmond, Wash. Briefly described, the ECD utility can open an electronic file in a creator application program by retrieving an application identification tag from the electronic file that identifies the creator application program.

The term software "utility" typically denotes a standalone software program that solves narrowly focused problems or problems related to computer system management and operates in conjunction with other application programs, such as a desktop publishing application program. However, a "utility" within the meaning of this specification may also be incorporated into a computer operating system or software function, routine, or dynamic link library (DLL) that is configured as an independent object or module accessible by other software modules through a predefined set of interfaces. The invention therefore encompass any type of software module or system that performs the methods of the ECD utility described in this specification, and is not limited to a particular object configuration, such as a narrowly tailored software program. In addition, although the present invention is described in the context of a component manager application program, those skilled in the art will appreciate that the invention is applicable to other programs that manage a suite of individual application programs and computer operating systems, and the like. For purposes of illustration in this application, the ECD utility is described as a stand alone software program operating in conjunction with Microsoft's "OFFICE 2000" application program running under one of Microsoft's computer operating systems, such as "WINDOWS 95", "WINDOWS 98", or "WINDOWS NT".

An edit command delegation (ECD) utility allows a user to edit the content data of an electronic file in a creator application program while the electronic file is being viewed in a separate viewing application program operable for viewing the electronic file. The viewing application program is not operable for editing the content data of the electronic file. Rather, the term "viewing application program" refers to application program that are capable of viewing, but not editing the content data of the electronic file, such as Microsoft's browser application program, "INTERNET EXPLORER". However, those skilled in the art will appreciate that the term "viewing application program" may also refer other application programs, such as file management programs (e.g., "WINDOW'S EXPLORER), which are operable for viewing the electronic file (i.e., in a graphical representation of a file structure) but are not operable for editing the content data of the electronic file.

In response to a user input to edit the electronic file, the ECD utility opens the electronic file and reads an application identification tag contained within the content of the electronic file. The application identification tag identifies a creator application program, which was used to create the electronic file and is operable for editing the content data of the electronic file. Once the ECD utility reads the application identification tag, the ECD launches the creator application program. The ECD utility then causes the creator application program to open the electronic file. Once the electronic file is open, the content data is displayed in a window controlled by the creator application program to allow the user to edit the content data.

Generally, each application program running under the "OFFICE 2000" environment that can create an HTML-formatted file writes an application identification tag into the contents of the file each time the file is saved in addition to adding the extension .htm or .html to the file. Although the electronic file is described in terms of an HTML file format those skilled in the art will appreciate that the ECD utility may be applied to other file formats without altering the scope to the invention.

Specifically, the application program places the application identification tag as an entry within the head tag portion of the body section of the HTML-formatted file. As an example, most electronic files contain a header portion for storing system information and a content portion for storing content data. However, the content portion of HTML files may also contain a head section and a body section. The head section typically is delineated by a head tag and stores information about the file, such as links to other files. The remaining section of the content portion is denoted by a body tag, and contains content data. As a specific example, in the "OFFICE 2000" environment, each application program places the application identification tag, known as the Programmatic Identifier (ProgId) META tag, in the head section of the content portion of the HTML-formatted file. The ProgId META tag identifies the application program that was used to create the file. More specifically, each application writes out the following ProgId META tag <HEAD>
•
•
•
<META name=ProgId contents=<ProgId_of_creator_application>>
•
•
•
</HEAD> where <HEAD> denotes the beginning of the head section, </HEAD> denotes the end of the head section, and <ProgId_of_creator_application>is the version independent Programmatic Identifier for that application program written in a standard format. The use of a standard format allows a program module, such as the ECD utility, to easily read and retrieve the Programmatic Identifier. To illustrate, if the "EXCEL" spreadsheet program is used to create the electronic data file, then the ProgID META tag, which is written into the header portion of the HTML-formatted file, would be <META name=ProgId content=Excel.Sheet>

The HTML-formatted file still retains an extension that indicates the format of the electronic file. Therefore, when the user selects the HTML-formatted file, the HTML-formatted file is opened in a browser application associated with the extension. When the user selects the edit operation, however, the ECD utility opens the HTML-formatted file and retrieves the application identification tag. Although the application identification tag has been described as being placed in the head section of body portion of an electronic file, those skilled in the art will appreciate that the application identification tag may be placed anywhere within the electronic file (e.g., header portion, body portion, etc.) without altering the scope of the invention.

The ECD utility then searches a look-up table stored in the computer system, such as the operating system's registry, for the entry that corresponds to the application identification tag. Although for purposes of this application, the look-up table is described in terms of the "WINDOWS" operating system registry, those skilled in the art will appreciate that other look-up table configurations, may be used with the ECD utility without altering the scope of the invention.

Once the entry in the "WINDOWS" registry is found, the ECD utility retrieves the path to the application program associated with the application identification tag. Typically, the application identified by the application identification tag is the application that was used to create the electronic file. For purposes of this application, this application identified by the application identification tag is referred to as the creator application program. Next, the ECD launches the creator application program retrieved from the "WINDOWS" registry. The creator application program then opens the HTML-formatted file to allow user to edit the file.

In another embodiment, instead of the ECD utility launching the application program, the ECD utility passes the path retrieved from the "WINDOWS" registry to a separate program module within the computer operating system to launch the application program.

The ECD utility also can install itself onto the computer system in response to a setup routine in "OFFICE 2000" selected by the user. The ECD utility determines if an application program is stored, or registered, within a "WINDOWS registry" entry under the Edit Verb for a particular class of electronic files, such as HTML-formatted electronic files. First, the ECD utility retrieves the registry entry HKEY_CLASSES_ROOT\.htm to determine the browser application program, which is the value to be substituted with the <BrowserAppId> below. Then, the ECD utility examines the Edit Verb registry entry HKEY_CLASSES-
   ROOT\<BrowserAppId>\shell\edit\command which contains the path to an application program, which is launched when the user chooses the edit command in connection with an HTML file. The computer application specified by the <BrowserAppId>\shell\edit\command entry is automatically launched each time an HTML formatted file is edited regardless of which application program running under "OFFICE 2000" was use to create the HTML file. For example, a text editing application program, such as Microsoft's "NOTEPAD", may be registered under the Edit Verb for HTML-formatted files. Consequently, when a user chooses to edit an \HTML file, the HTML file will be opened in the text editor application program.

Once the ECD utility determines which application program is registered under the Edit Verb, the installation procedure copies the entire Edit Verb entry to a Default Editor registry entry and an Old Default Editor registry entry within the "WINDOWS" registry. In this manner, the original registry entry is retained in case the ECD utility is uninstalled. The entry in the Default Editor key contains a default computer application to be used to edit the HTML file. Once the Edit Verb entry is copied to both keys, a setup procedure deletes the entry under the Edit Verb.

Next, the setup procedure of the ECD utility registers the ECD utility under the Edit Verb as the default application to be launched whenever an edit command is selected in connection with an HTML formatted file. Consequently, the ECD utility is accessed each time an edit command is executed in connection with an HTML file.

In still another embodiment, the ECD utility may launch a default application capable of editing the content data of the electronic file if the electronic file does not contain the application identification tag. The user may specify the default application or it may be the application program associated with the registry entry copied to the Default Editor key during the installation step above. Typically, the default application program is capable of editing text (e.g., a text editing program, or a word processing program) and therefore capable of o providing a limited set of editing capabilities. For example, if the electronic file was created using the "EXCEL" spreadsheet program, the file most likely will contain formatting and syntax within the content data that is specific to the "EXCEL" program. Therefore, the default program will be unable to edit those specific aspects of the electronic file. However, the default program may still be used to edit those portions of the electronic file that are not saved in a format specific to the creator program. Referring to the above example, if the content data of the HTML-formatted file created using the "EXCEL" application program contained a pie-chart and text, the default application would be unable to edit the pie-chart due to the pie chart being stored in "EXCEL" specific format. Nonetheless, the default application would still allow the user to edit those portions of the content data not stored as text format, but instead stored in HTML format. Thus, in this manner, the default application program still provides the user with limited editing capabilities in the event that the electronic file does not contain an application identification tag. For example, the ECD utility may launch Microsoft's "NOTEPAD" as the default application program. Although "NOTEPAD" has the capabilities to edit an HTML-formatted file created in "EXCEL", "NOTEPAD" lacks the rich text editing environment of "EXCEL". Furthermore, "NOTEPAD" lacks the ability to display the content in a "What You See Is What You Get" or "WSYSIWYG" environment.

In still another embodiment, the electronic file may contain a second application identification tag that also identifies the creator application program. Some application programs place the second application identifier tag, known as a generator META tag within the header of the electronic file. The generator META tag is used by search engines to locate files created by the creator application program. Although the generator META tag is contained in the electronic file, it is not used to launch the creator application program because it is stored in a format, typically text, which makes it difficult for the ECD utility to identify the creator application program. For example, the generator META tag <META name=Generator content=<application>> where <application> is a text string identifying the creator application program. To further illustrate, if the "EXCEL" spreadsheet program is used to create the electronic data file, then the generator META tag, which is written into the header portion of the HTML-formatted file, would be <META Name=Generator Content=Microsoft Excel 9>.

However, the ECD utility is configured to read the generator META tag format in the event that the ProgID META tag is not present. The ECD utility then maps the content of the generator META tag, which is typically in text format, to the standard format used by the ProgID. The ECD utility then uses the mapped entry in the standard format to launch the creator application program and open the electronic file. Finally, the creator application program displays the electronic file in a window controlled by the creator application program to allow the user to edit the program.

The ECD utility may also install itself onto a computer system. The ECD utility first determines whether a first location in a computer system contains an entry associated with a default application program. For example, the first location of the computer system may be represented by an entry in the "WINDOWS" registry, known as a "key." In this case, the ECD utility examines a registry entry, specifically the Edit Verb registry key for the class of HTML-compatible electronic files. The Edit Verb registry key typically contains the path for the default application program used to edit HTML-formatted files. Therefore, whenever a user issues an edit command for an electronic file in an HTML file format, the application program identified by the entry under the Edit Verb key is launched.

If the first location in the computer system contains the default application program, the ECD utility copies the entire entry under the Edit Verb key to an entry under the Default Editor key and an Old Default Editor key. By copying the entry under the Edit Verb key to the Old Default Editor key, the ECD utility preserves the original "WINDOWS" registry configuration. This allows the user to restore the original registry entries in the event the ECD utility is removed from the computer system, either inadvertently or by user interaction.

Next, the ECD utility removes the default application registered as the default editor for the class of HTML-formatted electronic files so that the ECD utility may be registered as the default application. The ensures that the ECD utility is launched each time an edit command is initiated for an HTML-formatted file.

Next, the ECD utility registers itself in the Edit Verb registry key as the default application program to be launched when an edit command is initiated for an HTML-formatted file. Consequently, each time the user initiates an edit command with respect to an HTML-formatted file, the ECD utility is launched. Once launched, the ECD utility determines the appropriate application to launch to edit the HTML-formatted file.

The ECD utility may also open the electronic file using a uniform resource locator (URL) associated with the electronic file. The ECD first determines if a directory path tag is set in the file, which specifies the directory path to the original location of the electronic file. Typically, the original location of the electronic file is on the hard disk within the user's computer system. The directory path tag indicates that the file being opened for editing is a preview file created for viewing, and not the original electronic file. If the directory path tag is present, the ECD utility determines if the original file is currently open in the creator application program. If the electronic file is already open in the creator application program, the ECD utility switches to the open file. However, if the electronic file is not open in the creator application program, the ECD utility causes the creator application program to open the electronic file.

If the directory path tag is not set in the electronic file, and the path to the electronic file is a URL, the ECD utility determines whether the creator application program can open an electronic file using the URL by checking the Boolean value in a URL locator entry associated with the creator application program. If a URL locator entry contains the Boolean value "TRUE", typically represented by either a "1" or "YES" character string, the ECD utility passes the URL associated with the electronic file to the creator application program to open the file. Otherwise, the ECD utility passes the directory path associated with the electronic file to the creator application program. However, if the path to the electronic file is not a URL, the ECD utility passes the directory path associated with the electronic file to the creator application program.

However, if the URL locator entry contains the Boolean value "TRUE", indicating that the creator application cannot open an URL site, the ECD utility passes the directory path stored in the viewing application program's cache memory to the creator application program. The viewing application program's cache memory stores the location of the electronic file being viewed by the viewing application program on a portion of the random access memory (RAM). For example, in a browser application program, the cache memory, known as the browser cache, stores the path indicating the location for a predetermined number of electronic files that have been viewed. This allows the user to quickly alternate between files that have recently been viewed in the browser application. If the user selects the "BACK" command, indicating they wish to view the previous electronic file, the browser application program merely looks up the path in the browser cache instead of having to retrieve the path of the previously viewed file from the hard disk. This allows for quicker access times for opening the electronic files in the browser application program. The ECD utility takes advantage of the viewing application cache (e.g., browser cache) by using it to retrieve the directory path of the viewed file. Using the directory path stored in the viewing application's cache memory reduces the time required to retrieve the location of the electronic file used by the creator application program top open the electronic file for editing.

Figure 1:
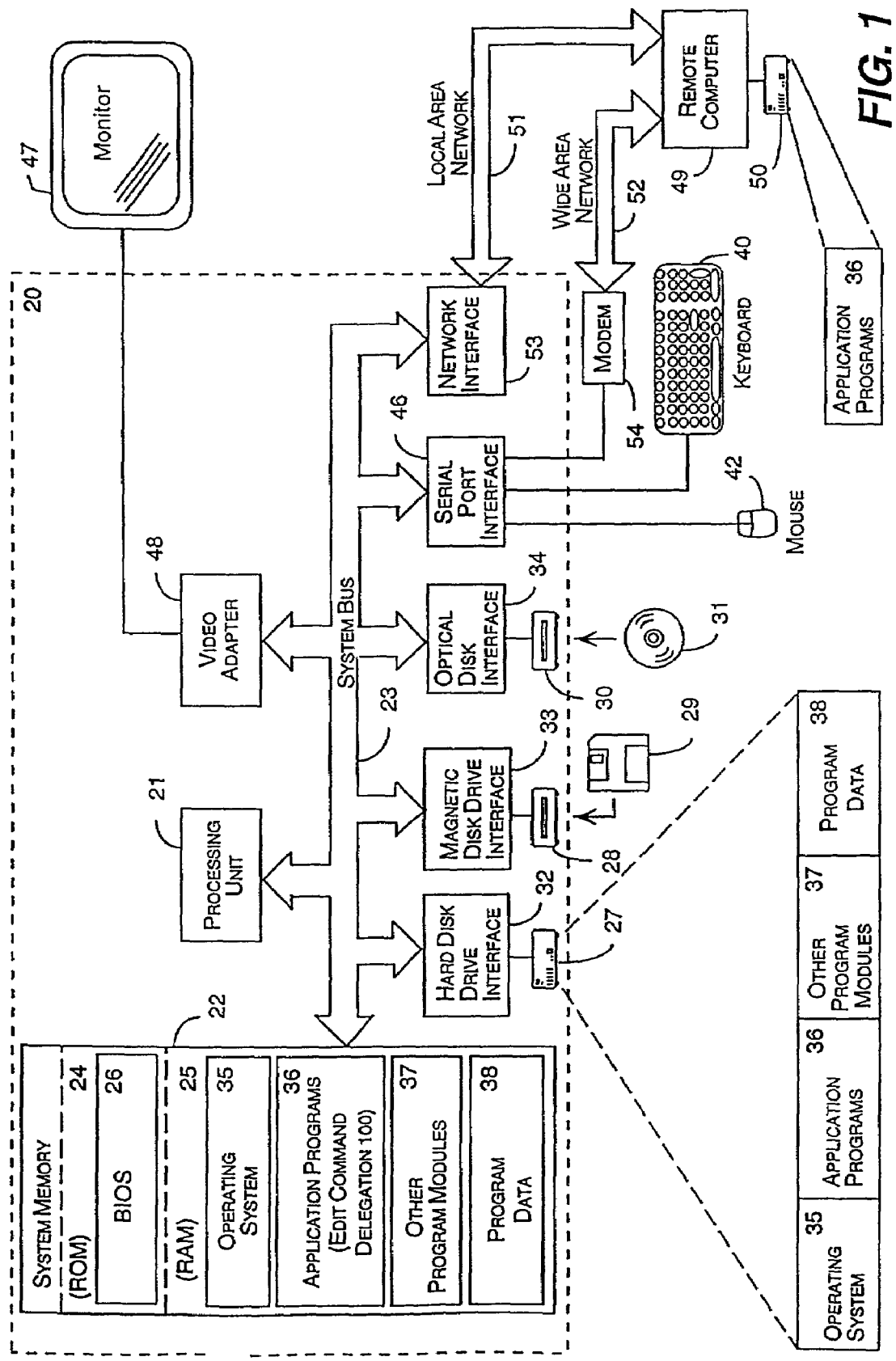
FIG. 1 is a block diagram of a personal computer that provides the operating environment for an embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs, 36, which may include the Edit Command Delegation utility program 100, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
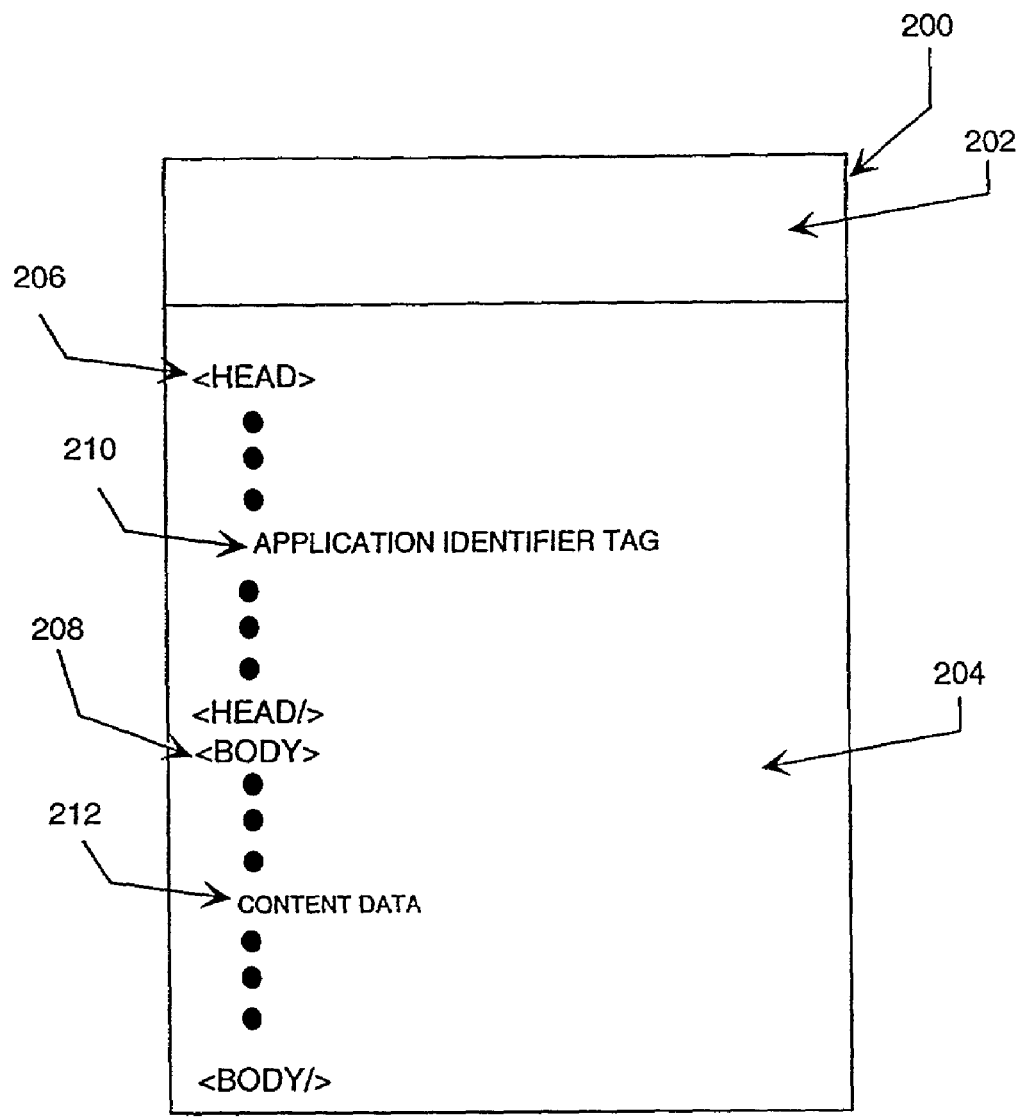
FIG. 2 is an illustration of the file structure of an electronic file containing an application identification tag used by the present invention.

FIG. 2 is an illustration of a typical file structure in computer systems operating under the "WINDOWS 98" environment. An electronic HTML file 200 contains a header portion 202 and a content portion 204. The header portion 202, typically contains information regarding the management of the file, such as the name of the file, the size of the file, the time and date the file was created, and the address of where the file is located in the computer disk. The content portion 204 of the electronic HTML file 200 contains a head section 206 and a body section 208. The head section 206 may contain the application identification tag 210, which identifies the creator application program used to create electronic HTML file 200. For example, each application running under the "OFFICE 2000" environment, such as "EXCEL", writes an application identification tag 210, known as a Programmatic Identifier (ProgID) META tag, into the head section 206 of an electronic file each time the file is saved. This application identification tag indicates that "EXCEL" was used to create that particular electronic file. The body section 208 contains the content data 212.

Normally, the creator application program places the application identification tag 210 in the same location within each electronic file. This allows the ECD utility 100 to easily locate the application identification tag 210 in the electronic HTML file 200. For example, each creator application may write the application identification tag 210 in the head section 206. This allows the ECD utility 100 to quickly locate the application identification tag 210 without having to search the entire header portion. Although the application identification tag 210 is described as being placed in the head section 206 of the electronic HTML file 200, those skilled in the art will appreciate that application identification tag 210 may be placed at any location within the electronic HTML file 200 without altering the scope of the invention.

Figure 3:
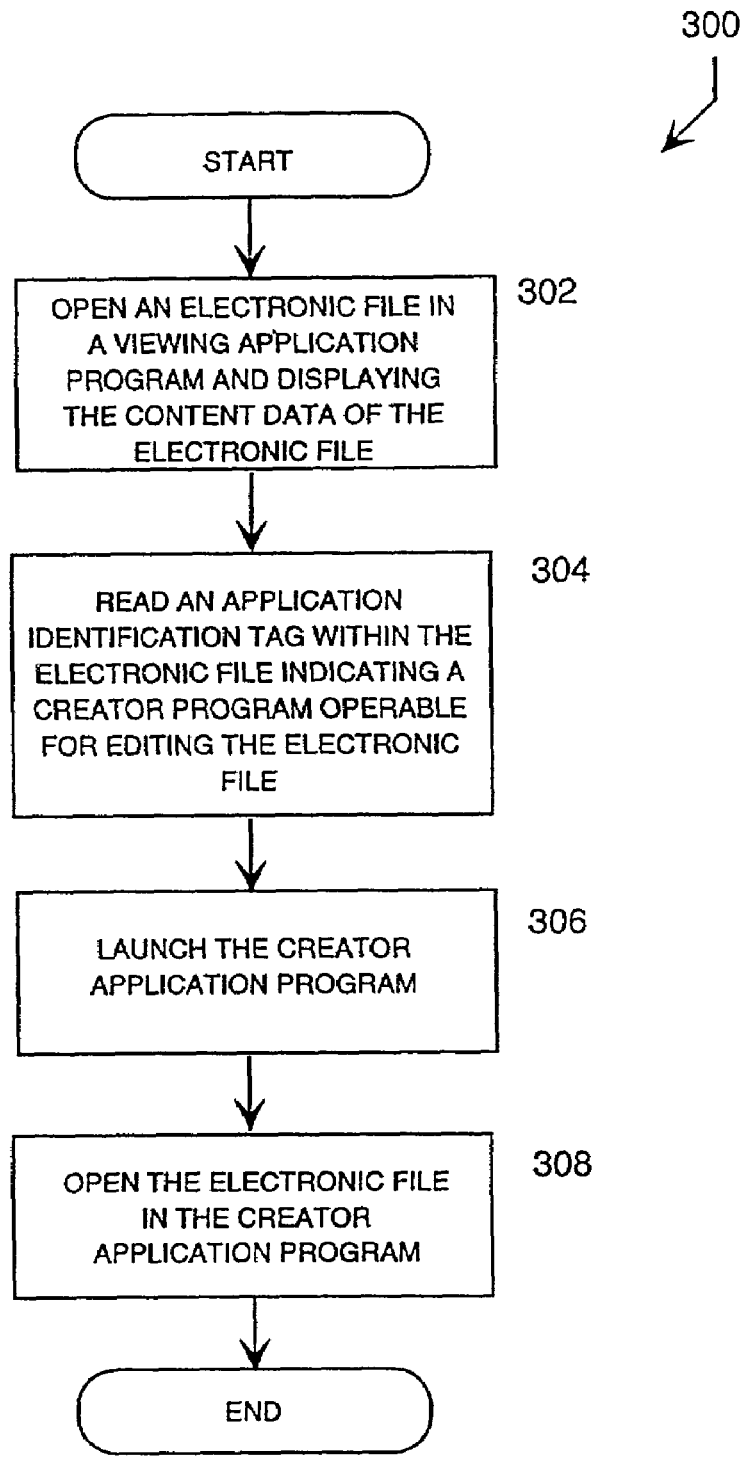
FIG. 3 is a logic flow diagram illustrating an exemplary process for applying an edit command delegation (ECD)

FIG. 3 is a logic flow diagram illustrating a routine 300 for applying the operation of the Edit Command Delegation utility 100 (FIG. 1) to an electronic file generated by an application program. Those skilled in the art will appreciate that the logic flow diagram of FIG. 3 is executed by the processing unit 21 (FIG. 1) in response to instructions that have been incorporated into the Edit Command Delegation utility 100. The ECD utility is applied to an electronic file, which is currently opened and being displayed by a first application program. Typically, the first application program is capable of viewing the contents of the electronic file but may be unable to perform other operations, such as editing and formatting the contents of the file. For example, an Internet browser is typically able to view HTML files but is unable to allow the user to edit those files.

The routine 300 begins at step 302, in which an electronic file 200 is opened in a viewing application program capable of viewing, but not editing the content data 212. The content data 212 is displayed in a window controlled by the viewing application program. Step 302 is followed by step 304, in which the ECD utility reads the application identification tag 210 from the electronic file 200.

Step 304 is followed by step 306, in which the ECD utility uses the application identification tag 210 to launch a creator application program identified by the application identification tag 210. The creator application program allows the user to edit the content data 212 of the electronic file 200. Typically, the creator application will be the application program used to create the electronic file. However, the creator application program is not required to be the creator application program. The creator application program may be any application program capable of editing the content of the electronic file, as discussed below.

Finally, step 306 is followed by step 308, in which the electronic file 200 is opened within the creator application program. Opening the electronic file 200 in the creator application allows the user to edit the content data 212. Upon opening the electronic file, the creator application program converts the format of the HTML file to a format supported by the creator application. This allows the user to edit those portions of the content data 212 that has a format specific to the creator application program. Thus, for the above example, when the HTML-formatted file is opened in the "EXCEL" spreadsheet application program, the format of the content data 212 is converted from HTML "EXCEL" format, thereby allowing the user to edit the content data 212 that is stored in both the non-specific and specific formats. Lastly, step 308 is followed by the "END" step.

FIG. 4 is a logic flow diagram illustrating a routine 400 illustrating another embodiment of the invention. Routine 400 begins at step 402, in which the electronic file 200 is opened in a viewing application program. Step 402 is followed by step 404, in which the determination is made whether the electronic file 200 contains the application identification tag 210. The determination is made in response to a user initiating an edit command while viewing the content data 212 in the viewing application program.

If a positive determination is made that the electronic file 200 contains the application identification tag 210, the "YES" branch is proceeds to step 406, in which the ECD utility reads the application identification tag 210 contained in the electronic file 200. Step 406 is followed by step 408, in which the ECD utility launches the creator application program.

Step 408 is followed by step 410, in which the determination is made whether the creator application is present on the computer system. If the determination is made that the creator application program is present on the computer system, the "YES" branch is followed to step 416, in which the electronic file 200 is opened in the creator application program to allow the user to edit the content data 212. Step 416 is followed by the "END" step.

However, if the determination is made that the creator application program is not present on the computer system, the "NO" branch is followed to step 412, in which the ECD launches a default application program. The default application program is typically selected by the ECD utility during the installation process (described below in FIG. 6). Normally, the default application program is a text-based application program, such as a text-editing application program or a word processing application program, because the text-based application programs are generally more adept at editing HTLM files. For example, if the electronic file 200 was created using the "EXCEL" spreadsheet program containing specific formatting and syntax, the default program may still be used to edit those elements of the electronic file that are not saved in a format specific to the creator program, specifically the non-text elements. Therefore, using text-based application programs as the default application provides the user some editing capabilities if the ECD utility 100 cannot launch the creator application program.

Step 412 is followed by step 414, in which the default application opens the electronic file 200 to allow the user to edit the content data 212. Step 414 is followed by the "END" step.

Returning to step 404, if the determination is made that the electronic file 200 does not contain the application identification tag 210, the "NO" branch proceeds to step 412 which is described above.

FIG. 5 illustrates a routine 500 of another embodiment of the ECD utility 100. Routine 500 begins at step 502, in which the electronic file 200 is opened in a viewing application program. Step 502 is followed by step 504, a determination is made whether the electronic file 200 contains the application identification tag 210. The determination is made in response to a user initiating an edit command while viewing the content data 212 in the viewing application program.

If the determination is made that the that the electronic file 200 contains the application identification tag 210, the "YES" branch proceeds to step 506, in which the ECD utility reads the application identification tag 506 contain in the electronic file 200. Step 506 is followed by step 508, in which the determination is made whether the creator application program is present on the computer system. If the creator application program is present on the computer system, the "YES" branch is followed to step 510, in which the ECD utility launches the creator application program identified by the application identification tag 210. Step 510 is followed by step 512, where the electronic file 200 is opened in the creator application program to allow the user to edit the content data 208. Step 512 is followed by the "END" step. Returning to step 508, if the determination is made that the creator application program is not present on the computer system, the "NO" branch is followed to Step 520. At step 520, the determination is made whether a default application program is registered for editing the content data 212. If a default application program is registered for editing the content data 208, the routine 500 proceeds along the "YES" branch to step 522, in which the ECD utility 100 launches the default application. The routine 500 then proceeds to step 524, where the default application program opens the electronic file 200 to allow the user to edit the content data 212.

Returning again to step 520, if the ECD utility 100 determines that a default editor is not available to edit the content data 212, the "NO" branch is followed to step 526, in which case the ECD utility 100 launches an alternative default application program. The alternative default application program is typically an application program capable of editing text (e.g., a text editing program, or a word processing program) capable of opening the electronic file and providing, to some extent, a limited set of editing capabilities. This step is a final failsafe task to insure that the user may edit the content data 212, although with limited capabilities.

Step 526 is followed by step 528, in which the electronic file is opened in the alternative default application program. Lastly, step 524 is followed by the "END" step.

Referring back to step 504, if the determination is made that the electronic file does not contain a first application identifier tag, the "NO" branch advances to step 514. At step 514, the determination is made whether the electronic file contains a second application identification tag, namely a generator META tag. Some applications may write a generator META tag into the header portion 202 of the electronic file. The generator META tag typically is used by search engines to locate files created by the creator application program. Although the generator META tag is contained in the electronic file, it is not used to launch the creator application program for editing purposes because it is stored as a text string. The text string does not lend itself to easily for a program module to identify the creator application program because there is no standard for identifying the creator application program, unlike the standard used in the ProgID META tag.

If the electronic file 200 contains the second application identification tag, the "YES" branch proceeds to step 516, in which the ECD utility 100 reads the second application identification tag to identify the creator application program. Typically, the creator application program identified by the generator META tag will be the same as the creator application program identified by the ProgID META tag. The value contained in the second identification tag is typically stored as a text string.

Step 516 is followed by step 518, in which the ECD utility 100 maps the second identification tag to the creator application program. For example, mapping the generation META tag to "EXCEL" results in the content being translated from a text string to the standard format used to represent the content of the ProgID META tag. This allows the ECD utility 100 to quickly determine whether the creator application is present on the computer system and easily locate and launch the creator application. Step 518 then proceeds to step 508, which is described above.

Returning to step 514, if the electronic file 200 does not contain a second application identification tag, the routine 500 follows the "NO" branch to step 520, which is described in detail above.

FIG. 6 is a logic diagram illustrating a routine 600, which represents the installation procedure for the ECD utility 100. The routine 600 starts at step 602, in which the ECD utility 100 determines whether a first location in a computer system contains an entry associated with a default application program. For example, the first location of the computer system may be represented by an entry in the "WINDOWS" registry, known as a "key." In this case, the ECD utility 100 examines a registry entry, specifically the Edit Verb registry key for the class of HTML-compatible electronic files. The Edit Verb registry key typically contains the path for the default application program used to edit HTML-formatted files. Therefore, whenever a user issues an edit command for an electronic file 200 in an HTML file format, the application program identified by the entry under the Edit Verb key is launched.

If a determination is made that the first location in the computer system contains the default application program, the "YES" branch is followed to step 604, in which the ECD utility copies the entire entry stored in the first location to a second location in the computer system. Specifically, the ECD utility 100 copies the entire entry under the Edit Verb key to an entry under the Default Editor key and an Old Default Editor key. By copying the entry under the Edit Verb key to the Old Default Editor key, the ECD utility 100 preserves the original "WINDOWS" registry configuration. This allows the user to restore the original registry entries in the event the ECD utility 100 is removed from the computer system.

Next, step 604 is followed by step 606, in which the ECD utility 100 deletes the entry from the first location in the computer system. This removes the default application registered as the default editor for the class of HTML-formatted electronic files so that the ECD utility may be registered as the default application to be launched when an edit command is initiated for an HTML-formatted file.

Step 606 is followed by step 608, in which the ECD utility 100 places an entry into the first location that associates the ECD utility with the electronic file 200. To illustrate using the above example, the ECD utility 100 writes an entry into the Edit Verb registry key identifying the ECD utility 100 as the default application program to be launched when an edit command is initiated for an HTML-formatted file. Consequently, each time the user initiates an edit command with respect to an HTML-formatted file, the ECD utility 100 is launched. Once launched, the ECD utility 100 determines the appropriate application to launch to edit the HTML-formatted file. Finally, step 608 is followed by the "END" step.

FIG. 7 is a logic diagram illustrating a routine 700, which illustrates opening the electronic file. Routine 700 begins at step 702, in which the ECD utility 100 determines if a directory path tag is set to a first value in the electronic file 200. The directory path tag indicates that the file being opened for editing is a preview file created for viewing, and not the original electronic file 200. If the determination is made that the directory path tag contains the first value, the "YES" branch is followed to step 704, in which the ECD utility 100 determines if the electronic file 200 is currently open in the creator application program.

At step 704, if determination is made that the electronic file is currently open, the "YES" branch is followed to the "END" step. However, if the electronic file is not currently open in the creator application program, the "NO" branch is followed to step 716, in which the ECD utility 100 passes the directory path to the creator application program to open the electronic file 200.

Returning to step 702, if the determination is made that the directory path tag is set, the "NO" branch is followed to step 706, in which the ECD utility 100 retrieves the directory path from the preview file.

Step 706 is followed by step 708, in which the determination is made whether the directory path retrieved from the electronic preview file is a URL site. If the directory path tag is present in the electronic file 200 and the path to the electronic file 200 is a URL, the "YES" branch is followed to step 710, in which the ECD utility 100 determines whether the creator application program is capable of opening a uniform resource locator (URL) site by examining a valued stored in an URL locator entry associated with the creator application in the registry.

If the determination is made that the creator application program is capable of opening a URL site, the "YES" branch is followed to step 712, where the ECD utility 100 examines the URL locator entry and determines whether it contains a first value indicating the creator application is capable of downloading electronic files over a distribution computer network, such as an company-wide intranet or the Internet. Typically, the value stored in the URL locator entry is a Boolean value, in which the Boolean "TRUE" state is represented by a 1 or "YES" value and the Boolean "FALSE" state is represented by either a 0 or "NO" value. Therefore, if the URL locator entry contains the value 1 or "YES", indicating a "TRUE" state, the "YES" branch is followed to step 714, in which the ECD utility 100 retrieves the URL from the browser application program and passes the URL to the creator application. The creator application, uses the URL to locate of the electronic file 200 over a distribution computer network to download the electronic file 200 from a remote site specified by the URL. Step 714 is followed by the "END" step.

Returning to step 710, if the URL locator entry contains the value 0 or "NO", indicating a "FALSE" state, then the "NO" branch is followed to step 714, in which the directory path retrieved from the browser cache is passed to the creator application program. The creator application program uses the directory path to locate and open the electronic file 200. However, if the path to the electronic file 200 is not a URL, the ECD utility 100 passes the directory path from the viewing application cache associated with the electronic file 200 to the creator application program. Step 716 then proceeds to the "END" step.

The present invention thus provides a method for editing an HTML-formatted file in the creator application program that created the HTML-formatted file while the HTML-formatted file is being viewed using a browser application program. The present invention further provides a method to identify the creator application by reading an application identification tag contained within the electronic file.

It should be understood that the foregoing pertains only to the embodiments of the present invention, and that numerous changes may be made to the embodiments described herein without departing from the spirit and scope of the invention.

What is claimed is:

1. A computer-readable medium encoded with a data structure, comprising:
    an electronic file associated with a viewing application program, the electronic file having content data that is viewable but not editable by the viewing application program and is editable by an editor application program that is different from the viewing application;
    an identification tag embedded in the content data, the identification tag indicating the editor application program, wherein the identification tag associates the editor application program with the electronic file; and
    an edit command delegation utility that is installed in the data structure by;
        determining whether a first location in a computer system contains an entry associated with a default application program, the default application program being associated with the electronic file;
        in response to determining that the first location in a computer system contains an entry associated with the default application program; copying the entry to a second computer system location, deleting the entry from the first location in the system disassociating the default application program with the electronic file, and inserting an entry in the first location in the computer system associated with the edit command delegation utility; and
        in response to determining that the first location in a computer system does not contain an entry, inserting an entry in the first location in the computer system associated with the edit command delegation utility;
    wherein the edit command delegation utility is arranged to:
        receive an edit command to edit the content data,
        open the electronic file,
        determine the editor application program from the identification tag,
        launch the editor application program,
        display the content data in the editor application program, and
        receive user commands to edit the content data through commands associated with the editor application program.

2. A computer-readable medium having computer-executable instructions for modifying content data in an electronic file, comprising:
    associating the electronic file with a viewing application program;
    placing an identification tag into the content data of the electronic file;
    associating the identification tag with an editor application program different from the viewing application program, wherein the electronic file is editable by the editor application program;
    installing an edit command delegation utility operative for launching the editor application program, in a computer system, wherein the step of installing the edit command delegation utility comprises the steps of:
        determining whether a first location in a computer system contains an entry associated with a default application program, the default application
        in response to determining that the first location in a computer system contains an entry associated with the default application program, copying the entry to a second computer system location, deleting the entry from the first location in the system and disassociating the default application program with the electronic file, and inserting an entry in the first location in the computer system associated with the edit command delegation utility, and
        in response to determining that the first location in a computer system does not contain an entry, inserting an entry in the first location in the computer system associated with the edit command delegation utility:
    receiving an edit command to edit the content data;
    reading an identification tag within the electronic file indicating the editor application program that is operable for editing the content data;
    launching the editor application program;
    opening the electronic file in the editor application program;
    displaying the content data in a window controlled by the editor application program; and
    receiving user commands to edit content through commands associated with the editor application program.

3. A computer-readable medium encode with a data structure, comprising:
    an electronic file associated with a viewing application program, wherein the electronic file includes content data is viewable by the viewing application program, and further wherein the viewing application program is not operable for editing the content data, the electronic file comprising a first file format, the first file format being defined by a hypertext markup language (HTML) and a uniform resource locator (URL);
    an identification tag place in the content data o the electronic file, wherein the identification tag associates the electronic file with an editor application program different from the viewing application program, and wherein the electronic file is editable by the editor application program; and
    an edit command delegation utility that is arranged to:
        receive an edit command to edit the content data,
        read the identification tag within the electronic file,
        launch the editor application program,
        open the electronic file in the editor application program by:

changing the first file format to a second file format,
reading a directory path within the electronic file indicating the location in a computer system where the electronic file is stored for the URL,
determining whether a creator application program is configured to open the electronic file using the URL by checking a URL locator entry associated with the editor application program,
if the URL locator entry is set to a first value, passing the URL associated with the electronic file to the editor application program, and
if the URL locator entry is set to a second value, passing the directory path to the editor application program,
display the content data in a window controlled by the editor application program, and
receive user commands to edit the content through commands associated with the editor application program.

4. A computer-readable medium having computer-executable instructions for editing content data in an electronic file, wherein the electronic file comprises a first file format, the first file format being defined by a hypertext markup language (HTML) and a uniform resource locator (URL), comprising:

associating the electronic file with a viewing application program, wherein the electronic file includes content data is viewable by the viewing application program;

placing an identification tag into the content data of the electronic file;

associating the identification tag with an editor application program different from the viewing application program, wherein the electronic file is editable by the editor application program;

receiving an edit command to edit the content data;

reading the identification tag within the electronic file;

launching the editor application program;

opening the electronic file in the editor application program, wherein opening the electronic file comprises:

changing the first file format to a second file format, reading a directory path within the electronic file indicating the location in a computer system where the electronic file is stored for the URL, determining whether a creator application program is configured to open the electronic file using the URL by checking a URL locator entry associated with the editor application program, if the URL locator entry is set to a first value, passing the URL associated with the electronic file to the editor application program, and if the URL locator entry is set to a second value, passing the directory path to the editor application program:

displaying the content data in a window controlled by the editor application program; and receiving user commands to edit the content through commands associated with the editor application program.

* * * * *